United States Patent
Cai et al.

(10) Patent No.: US 9,032,239 B2
(45) Date of Patent: May 12, 2015

(54) HS-CAN BUS CLOCK RECOVERY USING A TRACKING OSCILLATOR CIRCUIT

(71) Applicant: STMicroelectronics R&D (Shanghai) Co. Ltd., Shanghai (CN)

(72) Inventors: Panny Cai, Shanghai (CN); Martin Haug, Shanghai (CN)

(73) Assignee: STMicroelectronics R&D (Shanghai) Co. Ltd., Shanghai (CN)

( * ) Notice: Subject to any disclaimer, the term of this patent is extended or adjusted under 35 U.S.C. 154(b) by 325 days.

(21) Appl. No.: 13/716,029

(22) Filed: Dec. 14, 2012

(65) Prior Publication Data

US 2013/0173949 A1 Jul. 4, 2013

(30) Foreign Application Priority Data

Dec. 31, 2011 (CN) .......................... 2011 1 0461961

(51) Int. Cl.
| G06F 1/04 | (2006.01) |
| G06F 1/12 | (2006.01) |
| G06F 11/30 | (2006.01) |
| G06F 3/044 | (2006.01) |

(52) U.S. Cl.
CPC .............. *G06F 1/04* (2013.01); *G06F 11/3051* (2013.01); *G06F 3/044* (2013.01)

(58) Field of Classification Search
CPC .......... G06F 1/04; G06F 3/044; G06F 11/305
USPC ......................................... 713/500, 501, 503
See application file for complete search history.

(56) References Cited

U.S. PATENT DOCUMENTS

| 6,393,577 B1 * | 5/2002 | Akamatsu et al. ............ 713/600 |
| 8,390,384 B1 * | 3/2013 | Daryanani et al. ............. 331/44 |
| 2010/0180142 A1 | 7/2010 | Newald |

* cited by examiner

*Primary Examiner* — Michael J Brown
(74) *Attorney, Agent, or Firm* — Allen, Dyer, Doppelt, Milbrath & Gilchrist, P.A.

(57) ABSTRACT

A method for recovering a clock frequency of a CAN bus, the method including: receiving a data signal, wherein the data signal includes at least one state transition; detecting the state transition; and adjusting a frequency of a clocking signal generated by an oscillator circuit, wherein the frequency is adjusted when the state transition is detected and adjusting the frequency is for recovering the clock frequency of the CAN bus.

17 Claims, 5 Drawing Sheets

HS-CAN BUS CLOCK RECOVERY USING A TRACKING OSCILLATOR CIRCUIT

CROSS REFERENCE TO RELATED APPLICATIONS

This application claims the priority benefit of China patent application number 2011/10461961.9, filed on Dec. 31, 2011, which is hereby incorporated by reference to the maximum extent allowable by law.

BACKGROUND

1. Technical Field

The techniques described herein relate generally to oscillator circuits, and more specifically to oscillator circuits used for clock and data recovery in an HS-CAN bus system.

2. Discussion of the Related Art

An oscillator circuit produces a repetitive electronic signal. Oscillator circuits are widely used in countless applications. In particular, oscillator circuits may be used in circuits that recover a CAN bus clock. CAN is a multi-master broadcast serial bus standard for connecting electronic circuit devices such as sensors, actuators, and other control devices.

In a CAN network, no clock is sent during data transmission. CAN nodes monitor the CAN bus and handle the bit timing logic (BTL) related to transmission and reception of data. CAN nodes utilize oscillator circuits to recover a CAN bus clock and data.

Evolving standards of the CAN bus, such as HS-CAN, may require CAN bus monitoring with higher accuracy (e.g., 4.5%) and may also increase the frequency of the bus. For example, HS-CAN introduces wake-up frames used to change nodes from a low-power state to an active state. Accurate monitoring is necessary in order to avoid errors such as missing a request to transition from a low-power state to an active state. Further, HS-CAN bus monitoring may increase an oscillator frequency requirement (e.g., 16 MHz).

In order to achieve accurate monitoring, conventional circuits that need to meet high accuracy monitoring requirements may oversample the incoming serial data. The stream may then be evaluated for data transition locations, and valid data bits may then be extracted from the oversampled data. In conventional CAN controller circuits, BTL is generally known to oversample with a frequency much higher than a baud rate in use. In order to oversample, a clock with multiple frequencies much higher than that of the CAN bus is needed.

In order to achieve high accuracy, conventional CAN nodes may incorporate high precision oscillators. Such high precision oscillators may be configured to operate at frequencies considerably higher than the data rate of the CAN bus. High precision oscillators (e.g., quartz, ceramic resonant, etc.) may introduce a higher cost. In addition, operating oscillator circuits at higher frequencies in order to oversample the data is generally known to increase current consumption requirements. Higher current consumption is generally known to be a critical parameter, particularly in HS-CAN transceivers that implement selective wake.

SUMMARY

Embodiments at providing a novel low frequency tracking oscillator circuit that accurately monitors a CAN bus and recovers a clock frequency of the bus and received CAN bus data based on at least one state transition of the received CAN bus data. The tracking oscillator circuit derives a sampling clock directly from an internal oscillator that runs at a same frequency as the CAN bus data. The tracking oscillator circuit provides the sampling clock with a programmable duty cycle in order to generate the CAN bus data.

One embodiment provides a method for recovering a clock frequency of a CAN bus, the method comprising: receiving a data signal, wherein the data signal comprises at least one state transition; detecting the state transition; and adjusting a frequency of a clocking signal generated by an oscillator circuit, wherein the frequency is adjusted when the state transition is detected and adjusting the frequency is for recovering the clock frequency of the CAN bus.

According to an embodiment, the method further comprises computing a restart time for resetting the oscillator and generating a synchronization signal based on the computed restart time, wherein the synchronization signal is configured to restart the oscillator when the state transition is detected.

According to an embodiment, the method further comprises computing a compensation time for charging and discharging a capacitive element of the oscillator circuit such that the frequency is adjusted and an operational frequency of the oscillator circuit is maintained.

According to an embodiment, the method further comprises determining an increase and decrease of the frequency based on the signal level of the clocking signal when the state transition is detected.

According to an embodiment, the method further comprises generating a sampling signal that determines a sampling point of the received data signal, wherein the duty cycle of the sampling signal is programmable and sampling of the received data signal recovers at least one CAN bit of the received data signal.

According to an embodiment, the state transition is a falling edge.

According to an embodiment, a tracking oscillator circuit is configured to recover a clock frequency of a bus, the circuit comprising: an edge detector circuit for detecting state transitions of a received data signal; and an oscillator core circuit configured to generate an internal oscillator of a first frequency wherein the first frequency is synchronized with a second frequency of the received data signal.

According to an embodiment, the oscillator core circuit comprises a first set of switches controlled by a first state of a synchronization signal, and a second set of switches controlled by a second state of the synchronization signal, wherein the oscillator is reset during the first state and the oscillator is free running during the second state.

According to an embodiment, the synchronization signal is generated by a sync generator circuit coupled to the edge detector circuit.

According to an embodiment, the tracking oscillator circuit further comprises a track and counter circuit for adjusting the frequency of the internal oscillator.

According to an embodiment, the tracking oscillator circuit further comprises a sampling circuit configured to sample the received data signal at a programmable sampling point.

According to an embodiment, a CAN bus system, comprises: a CAN bus which couples a master device to at least one slave device; the master device comprising; a clock generator adapted to provide a clock frequency for the CAN bus; and a sending device adapted to send data, having the clock frequency, via the CAN bus; the at least one slave device comprising: a receiver for receiving the data on the bus; and a tracking oscillator circuit configured to recover a clock frequency of the bus, the tracking oscillator circuit comprising: an edge detector circuit for detecting state transitions of a received data signal; and an oscillator core circuit configured to generate an internal oscillator of a first frequency wherein the first frequency is synchronized with a second frequency of the received data signal.

According to an embodiment, the first frequency is equal to the second frequency.

According to an embodiment, the tracking oscillator circuit further comprises a compensation circuit for charging and discharging a capacitive element of the oscillator core circuit.

According to an embodiment, the capacitive element has a value of 2 pF.

BRIEF DESCRIPTION OF DRAWINGS

In the drawings, each identical or nearly identical component that is illustrated in various figures is represented by a like reference character. For purposes of clarity, not every component may be labeled in every drawing. In the drawings.

DETAILED DESCRIPTION

The techniques described herein relate to oscillator circuits used for clock and data recovery in a CAN bus system. In particular, a tracking oscillator circuit is described. The tracking oscillator circuit is configured to accurately monitor a CAN bus and recover a clock frequency of the bus and received CAN bus data based on at least one state transition of the received CAN bus data.

Figure 1:
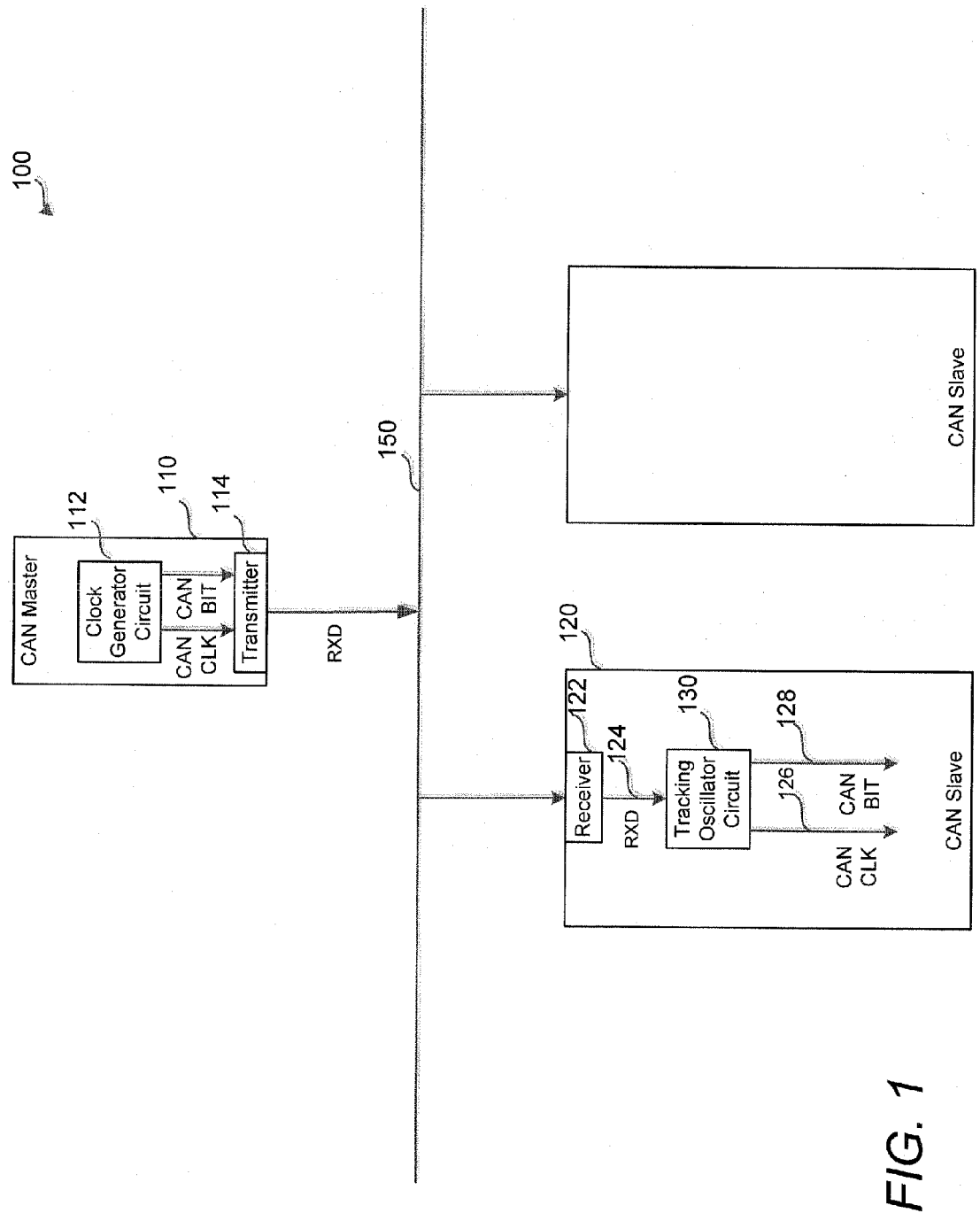
FIG. 1 shows a schematic block diagram of an embodiment of a CAN bus system having an embodiment of a tracking oscillator circuit.

FIG. 1 shows a schematic block diagram of an embodiment of a CAN bus system 100 having an embodiment of tracking oscillator circuit 130. CAN bus system 100 shows a CAN bus 150, a master device 110, and two slave devices 120. CAN bus 150 couples master device 110 to slave devices 120. Only two slave devices are shown for simplified representation in FIG. 1. Master device 110 has a clock generator circuit 112 and one sending device 114. Clock generator circuit 112 provides CAN CLK and CAN BIT. Sending device 114 sends CAN BIT via RXD on CAN bus 150.

Respective slave device 120 has a receiving device 122 and a tracking oscillator circuit 130. Receiving device 122 receives RXD 124 that is sent via the CAN bus 150 by master device 110. According to one embodiment, CAN bus 150 is implemented as open collector. RXD 124 may comprise "dominant" and "recessive" CAN bits, where dominant is a logical 0 and recessive is a logical 1. A dominant bit may be asserted by creating a voltage across the wires while a recessive bit is simply not asserted on CAN bus 150.

Figure 2:
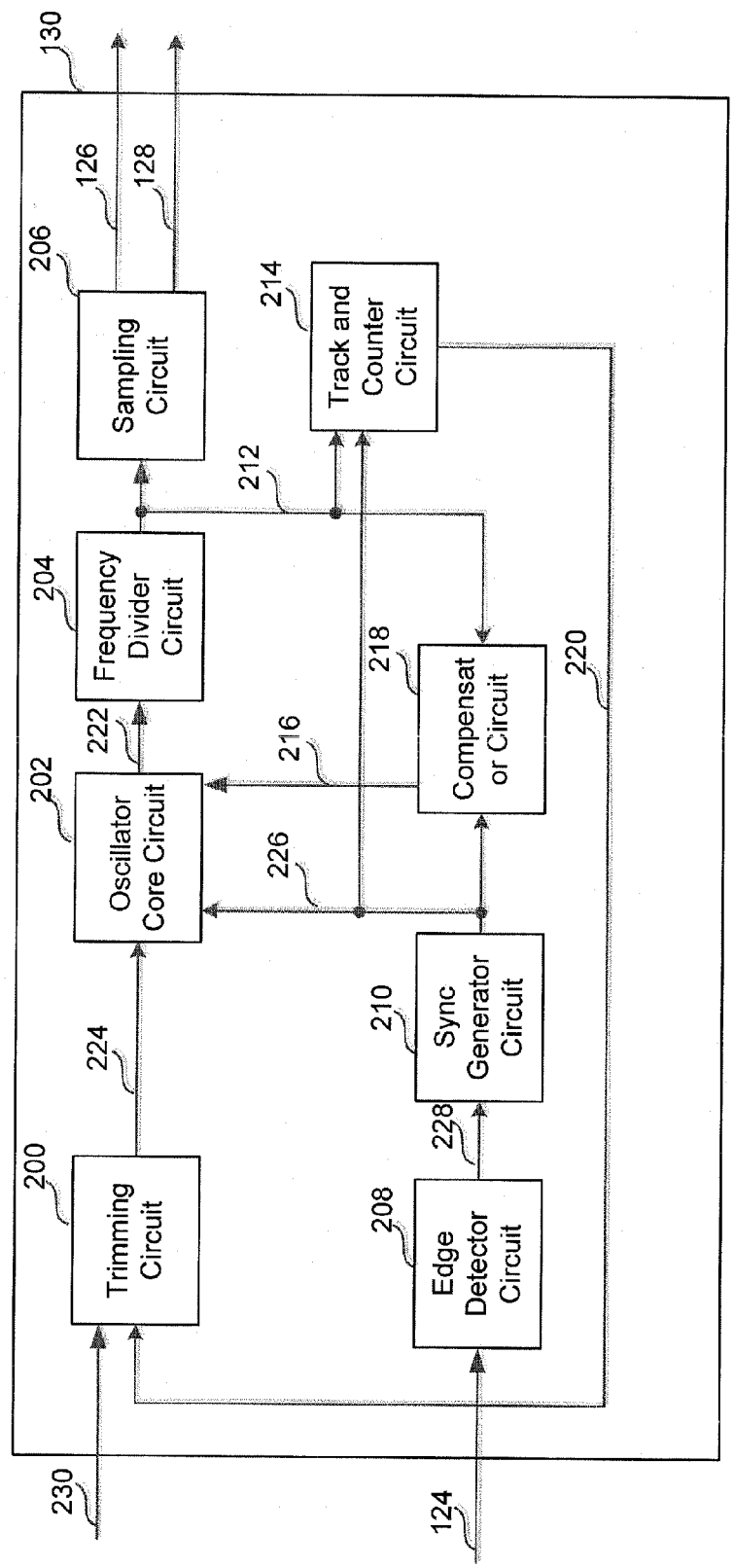
FIG. 2 shows a schematic block diagram of an embodiment of the tracking oscillator circuit.

According to one embodiment, slave device 120 has at least one tracking oscillator circuit 130. FIG. 2 shows an embodiment of tracking oscillator circuit 130 configured to recover a frequency of CAN CLK 126 and data CAN BIT 128 based on at least one state transition of received CAN data RXD 124.

As shown in FIG. 2, tracking oscillator circuit 130 comprises a trimming circuit 200, an oscillator core circuit 202, an edge detector circuit 208, a sync generator circuit 210, a compensator circuit 218, a track and counter circuit 214 and a sampling circuit 206. Tracking oscillator 130 is not limited in this respect.

FIG. 2 illustrates that input IBIAS 230 may supply a bias current to trimming circuit 200. According to one embodiment, trimming circuit 200 is configured to trim a current of oscillator core circuit 202. In one aspect, internal clock 222 frequency may be trimmed with a step of +/−0.3% based on the current trimmed with a step of +/−0.3%. According to one embodiment, internal clock 222 of a frequency 500 kHz +/−0.3% may be generated at room temperature after trimming.

RXD 124 is an input to tracking oscillator circuit 130. RXD 124 may be of a baud rate 500 kbit/s, 250 kbit/s, and 125 kbit/s. Oscillator core circuit 202 may be configured to generate an internal clock 222 of a frequency of RXD 124. According to one embodiment, multiple internal clock frequencies may be generated (e.g., 500 kHz, 250 kHz, and 125 kHz). As shown in FIG. 2, oscillator core circuit 202 may be coupled to frequency divider circuit 204. Frequency divider circuit 204 may be configured to generate phase clock 212 where phase clock signal 212 is of a multiplied frequency of internal clock 222. According to one embodiment, phase clock signal 212 may be of a frequency that is twice the frequency of internal clock signal 222.

Figure 3:
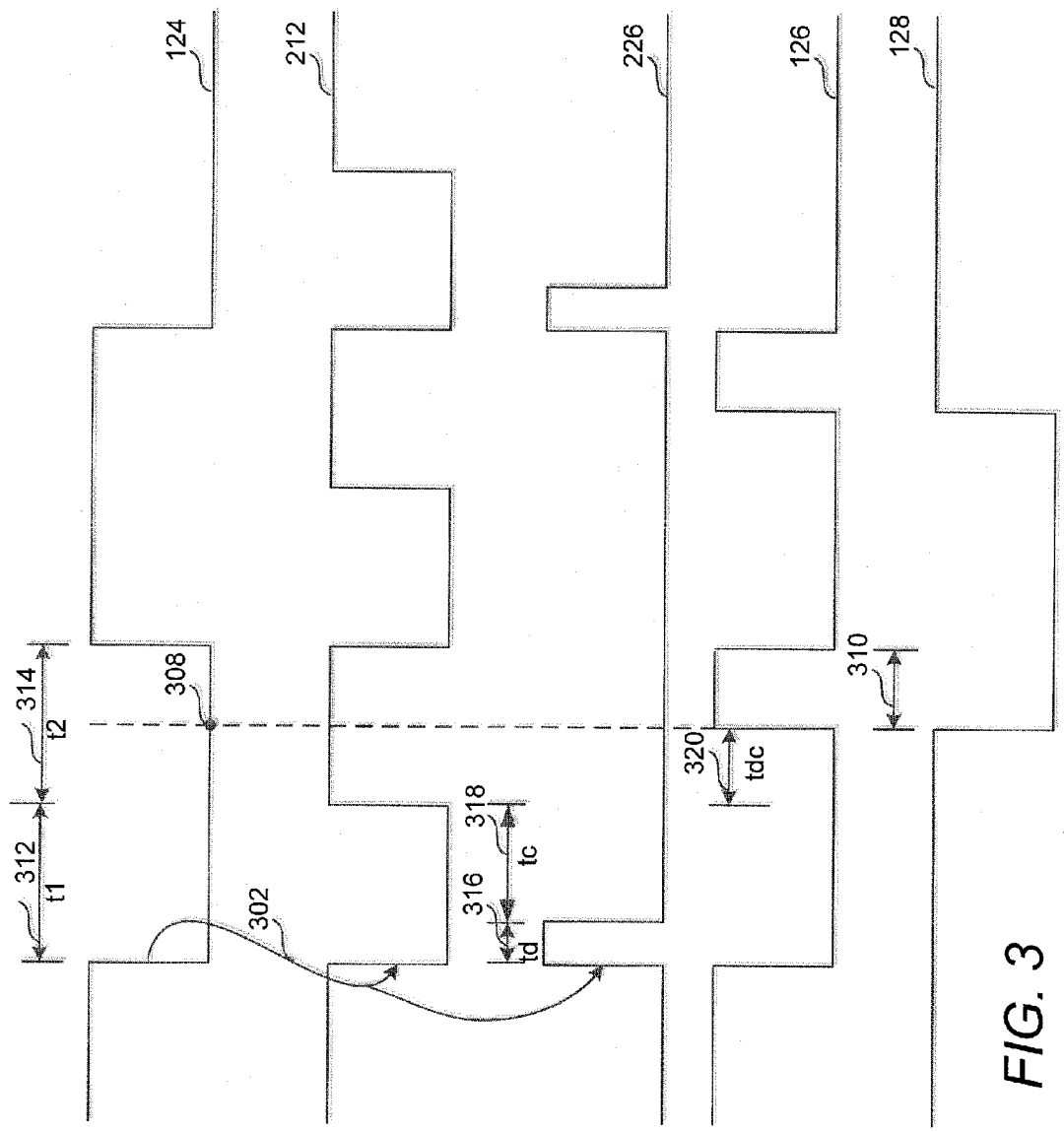
FIG. 3 shows an embodiment of the tracking oscillator circuit signal timing.

As shown in FIG. 2, RXD 124 is an input signal to edge detector circuit 208. According to one embodiment, RXD 124 has at least one state transition 302. Edge detector circuit 208 may perform detection of state transitions of RXD 124. FIG. 3 illustrates an embodiment of RXD 124 and an embodiment of a state transition 302. According to one embodiment, a state transition may be a falling edge (e.g., a transition from a CAN recessive to dominant state).

Edge detector circuit 208 may be configured to filter ringing on RXD 124. Ringing is a known artifact that may occur when RXD 124 transitions state. Filtering of ringing may be described as "blanking." By blanking RXD 124, edge detector circuit 208 may detect "true" state transitions of RXD 124. Edge detector circuit 208 may be coupled to a sync generator circuit 210 providing output signaling 228 to sync generator circuit 210. Sync generator circuit 210 may be coupled to oscillator core circuit 202, compensator circuit 218, and track and counter circuit 214.

Edge detector 208 output signaling 228 may be used by sync generator circuit 210 to generate synchronization signal 226 configured to restart oscillator core circuit 202 when an RXD 124 state transition 302 is detected. According to one embodiment, synchronization signal 226 may be generated based on a falling edge of RXD 124.

According to another embodiment, synchronization signal 226 may comprise at least one synchronization signal configured to control at least one switch element of oscillator core circuit 202. According to another embodiment, synchronization signal 226 may comprise multiple signals configured to control switch elements of oscillator core circuit 202. According to another embodiment, synchronization signal 226 may be generated based on a computed restart time. FIG. 3 illustrates a computed restart time td 316 of synchronization signal 226.

Figure 4:
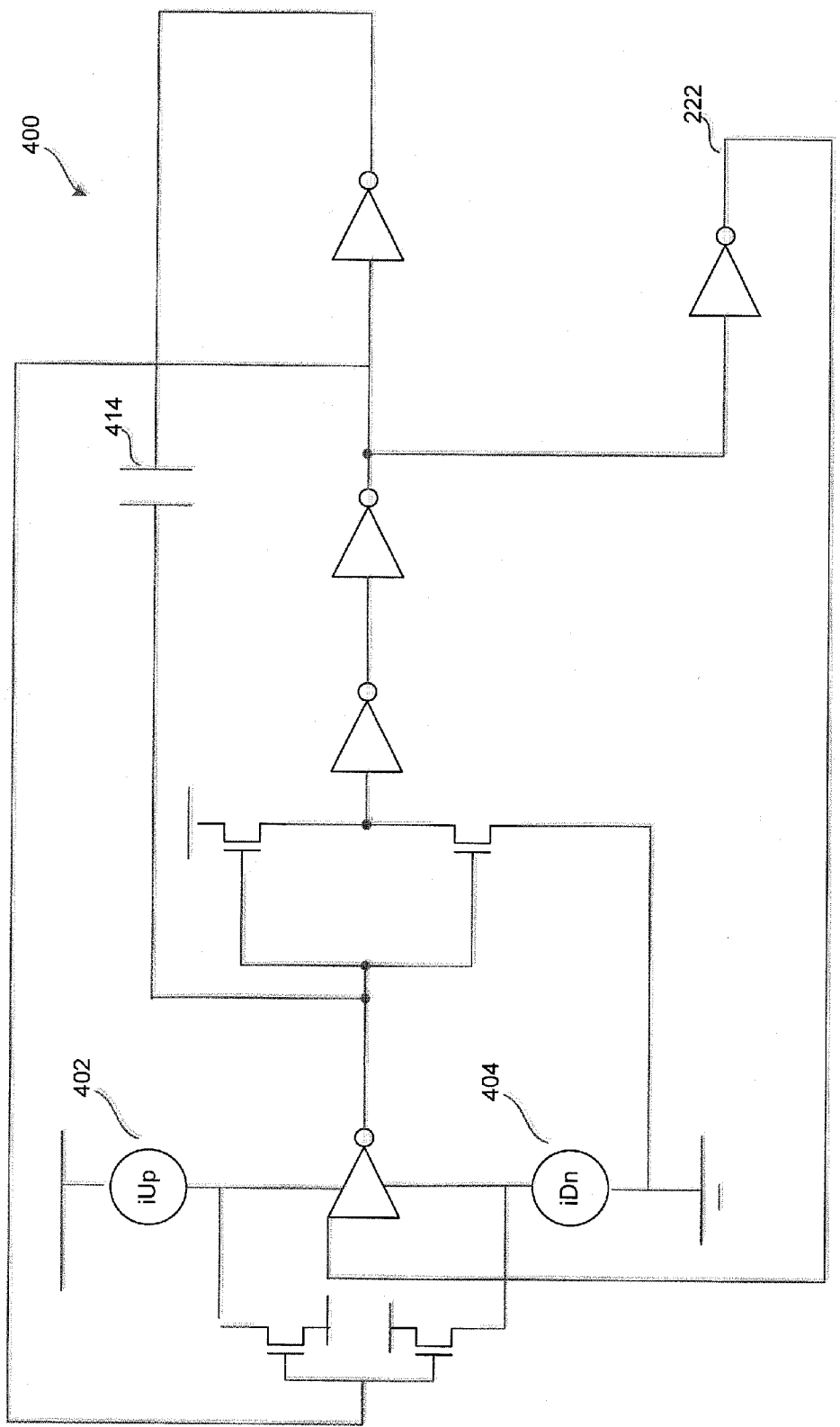
FIG. 4 shows a schematic diagram of an embodiment of a conventional oscillator.

According to one embodiment, oscillator core circuit 202 may be based on a conventional oscillator circuit 400 schematically shown in FIG. 4. Generally known elements and aspects of conventional oscillator circuit 400 will not be described herein. However, some aspects will be described as are relevant for discussion of oscillator core circuit 202. Currents iUp 402 and iDn 404 represent charge and discharge currents. A free-running frequency of conventional oscillator circuit 400 may be represented by:

$$f=2*iBias/(C*V), \text{ when } iUp=iDn=iBias$$

Selection of a value C of capacitive element 414 and voltage potential V determine in part the free-running frequency as shown above. According to one embodiment, the value of C is 2 pF, the value of V is 5V, the value of iBias is 2.5 uA, and the free-running frequency f is 500 kHz.

Figure 5:
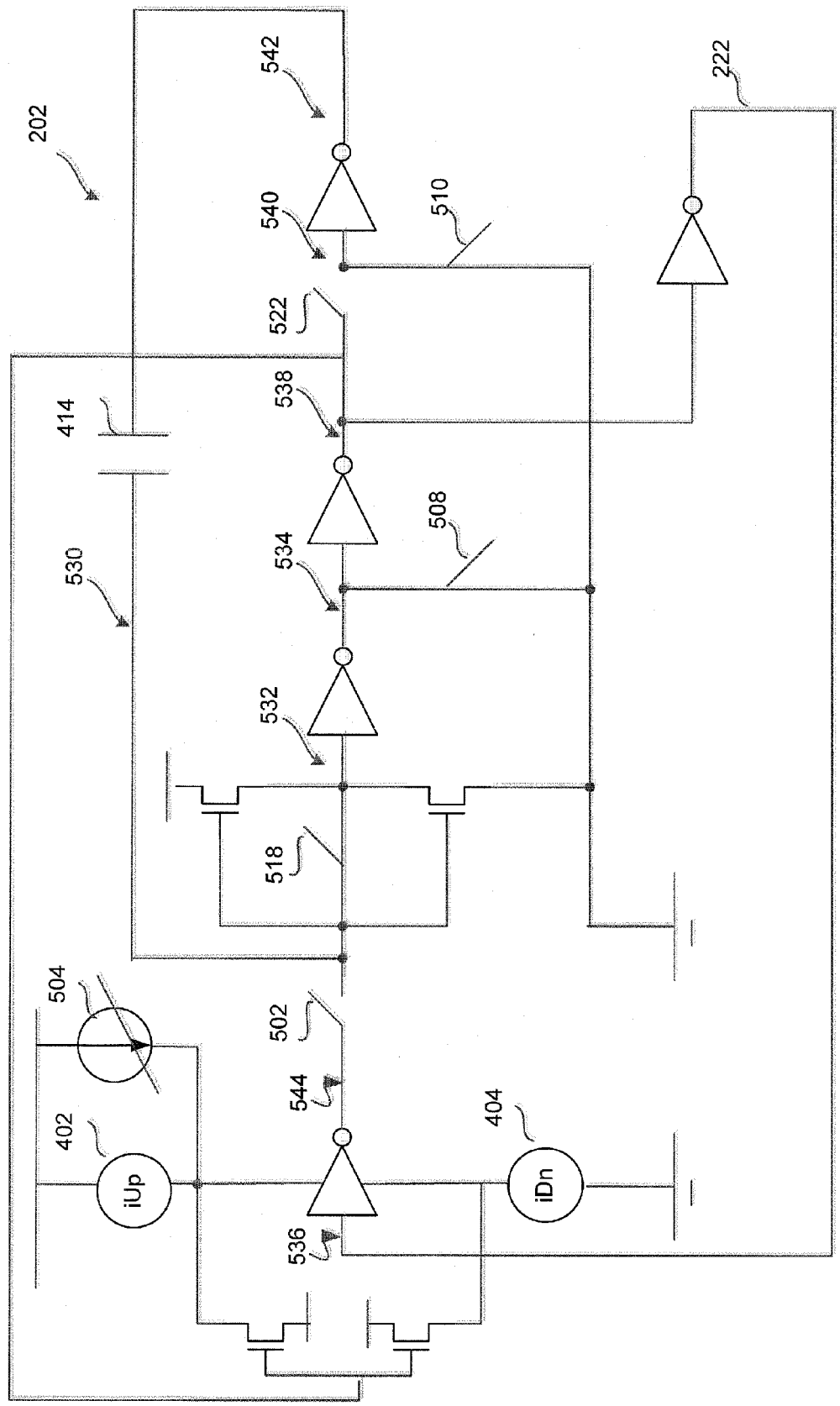
FIG. 5 shows a schematic diagram of an embodiment of an oscillator core circuit of the tracking oscillator circuit.

FIG. 5 schematically shows oscillator core circuit 202 based on the conventional oscillator circuit 400. Similar to conventional oscillator circuit 400, iUp 402 and iDn 404 charge and discharge capacitive element 414 to yield an internal clock 222.

However, oscillator core circuit 202 introduces switch elements 502, 518, 508, 522 and 510 shown. As discussed above, synchronization signal 226 may comprise at least one synchronization signal configured to control at least one switch element of oscillator core circuit 202. According to one embodiment, synchronization signal 226 controls the open and close states of switch elements 502, 518, 508, 522 and 510.

According to another aspect, switch elements 508, 510 and 518 are closed, and switch elements 502 and 522 are open to yield a reset state of internal clock 222 by coupling voltage 542 to GND. FIG. 5 illustrates the switch element open/close settings when internal clock 222 is reset. According to another aspect the reset state occurs during a restart time td 316 of synchronization signal 226 as illustrated in FIG. 3.

According to another aspect, synchronization signal 226 closes switch elements 502 and 522 and opens switch elements 508, 510 and 518 such that a free-running state of internal clock 222 may be generated.

According to one embodiment, when synchronization signal 226 is at a high state, as illustrated by td 316 in FIG. 3, then 530 is set to 532 and coupled to a voltage potential, 534 is coupled GND, 538 is coupled to a voltage potential, 536 is coupled to GND, 540 is coupled to GND, 542 is coupled to a voltage potential, and internal oscillator clock 222 is coupled to GND.

According to another embodiment, when synchronization signal 226 transitions to a low state, then voltage at 534 initially maintains at GND and 538 and 540 are coupled to a voltage potential, while 536 and 542 are coupled to GND. At a same time, voltages at 530 and 544 decrease, voltage at 532 increases, and the oscillator core circuit 202 may be restored to a free running state whereby internal oscillator signal 222 oscillates.

According to another embodiment, synchronization signal 226 comprises multiple synchronization signals configured to control the settings of switch elements of oscillator core circuit 202, and the synchronization signals are based on a timing that provides: voltage at 530 equal to voltage at 532 for at least 150 nsec; when synchronization signal 226 transitions from a high state to a low state; voltage at 540 transitions from the voltage potential to GND, such that voltage at 530 transitions in a same direction when the reset state transitions to a free-running state of internal clock 222; when synchronization signal 126 transitions to a high state, 544 is disconnected from 530 such that voltage at 544 is equal to voltage at 530 for a time needed to avoid overshoot current on 544; synchronization signal 226 controls switch element 508 for at least 20 nsec longer than switch element 518 such that a voltage at 534 transitions to control a predetermined transition direction (e.g., increase or decrease) of voltage 542.

Tracking oscillator circuit 130 comprises sampling circuit 206 configured to generate a sampling signal based on internal clock 222. The sampling signal determines a sampling point of RXD 124 based on a programmable duty cycle of phase clock 212.

According to one embodiment, the programmable duty cycle may determine a sampling point of 70-84% of a period of RXD 124 and may be programmable with a step of 2%. According to a preferred embodiment, the sampling point may be 75% of the period of RXD 124.

Phase clock 212 is provided to sampling circuit 204. According to one embodiment, sampling circuit 206 may control a sampling point 308 for sampling RXD 124. According to another embodiment, the sampling point 308 may be programmable. According to another embodiment, sampling point 308 may be generated by altering a rising edge of sampling signal 126 by determining a charge current of oscillator core circuit 202. According to another embodiment, CAN BIT 128 may be recovered using a D flip-flop configured to sample RXD 124 based on an input clock of sampling signal 126.

The main function of sampling circuit 206 is to sample RXD 124 precisely. According to one embodiment, a sample point may be programmable from 70% to 84% with step=2%. According to another embodiment, the sample point may be generated at a rising edge of phase signal 212. According to another embodiment, sampling signal 126 may be generated with tdc 320 computed as $$tdc=C*(V/(k*iUp))=2*C*V/(k*iUp)$$

By changing k, a different sample point may be achieved.

According to one embodiment, td 316 should be long enough to ensure that voltage at 530 becomes equal to voltage at 532 when synchronization signal 226 is at a high state. According to another embodiment, td 316 is less than 1 us, providing $$(td\ 316)+(tc\ 318)=(t1\ 312)=(t2\ 314)=1\ us$$

providing control over a compensation of an error in the internal clock 222 accuracy, the error based on a reset of the internal oscillator clock 222 during td 316. According to one embodiment, capacitive element 414 is 2 pF and td is computed as $$td=C*(V/(3*iUp))=2\ pF*(2.5V/3*5\ uA)=333\ ns.$$

Track and counter circuit 214 is coupled to sync generator circuit 210, oscillator core circuit 202, compensator circuit 218, frequency divider circuit 204, and sampling circuit 206. Phase clock 212 and synchronization signal 226 are inputs to track and counter circuit 214 in order to determine a frequency increase and decrease of internal oscillator clock 222.

According to one embodiment, when an falling edge of RXD 124 is detected, then internal oscillator clock 222 is restarted. If phase clock 212 is at a high state at the falling edge of RXD 124, then a frequency of internal oscillator clock 222 is determined to be too slow. If phase clock 212 is at a low state at the falling edge of RXD 124, then the frequency of internal oscillator clock 222 is determined to be too fast.

Track and counter circuit adjusts a counter so as to increase charge and discharge current of oscillator core circuit 202 to increase the frequency, or, decrease the counter so as to decrease charge and discharge current of oscillator core circuit 202 so as to decrease the frequency. In this way the frequency of internal clock 222 may become equal to the frequency of RXD 124.

Internal clock 222 may be provided as input to frequency divider circuit 204 so as yield phase clock 212 as illustrated in FIG. 3. FIG. 3 shows 312 and 314 which relate to a charge and discharge time of oscillator core circuit 202. Since oscillator core circuit 202 is reset during td 316, 318 relates to a compensation time whereby a charge current of oscillator core circuit 202 is increased in order to compensate for restart time td 316 such that the operational frequency is maintained.

Compensator circuit 218 may be configured to increase a charge current of oscillator core circuit 202. By increasing a charge current of oscillator core circuit 202, during a computed compensation time tc 318, restart time td 316 of oscillator core circuit 202 does not affect its operational frequency. FIG. 3 illustrates timing of td 316 and tc 318.

Since the oscillator core circuit 202 is reset during time td 316, based on a falling edge of RXD 124, time duration td 316 is considered an oscillator synchronization phase. A duration of time tc 318 following td 316 is considered a compensation phase. According to one embodiment, a charge current is increased within the tc 318 duration in order to cancel a frequency error introduced by the synchronization phase. According to one embodiment, synchronization phase (td 316) of the oscillator core circuit 202 does not impact an operational period of the oscillator core circuit 202 as FIG. 3 illustrates (td 316)+(tc 318)=t1.

Track and counter circuit 214 may provide adjustment 220 to trimming circuit 200 wherein the adjustment determines a frequency increase or decrease of internal oscillator clock 222. Track and counter circuit 214 may determine an adjustment 220 based on a level phase clock 212 when state transition 302 occurs. According to one embodiment, the adjustment may be made by increasing or decreasing a counter controlling a charge and discharge of oscillator core circuit 202. FIG. 5 shows compensation control 504 according to one embodiment. By adjusting a frequency of the oscillator core circuit 202 a frequency of CAN CLK 126 and RXD 124 may become equal.

Tracking oscillator circuit 130 comprises multiple feedback loops for controlling the frequency of internal clock 222 in order to track and synchronize internal clock 222 with RXD 124. Tracking oscillator circuit 130 outputs CAN CLK 126 based on phase clock 212 and outputs CAN BIT 128 as a result of sampling RXD 124 with the sampling signal 126 shown in FIG. 3.

Having thus described some illustrative embodiments of the invention, it should be apparent to those skilled in the art that the foregoing is merely illustrative and not limiting, having been presented by way of example only. Numerous modifications and other embodiments may be used that fall within the scope of the invention.

Use of ordinal terms such as "first," "second," "third," etc. in the claims to modify a claim element or item in the specification does not by itself connote any priority, presence or order of one element over another. In addition, the use of an ordinal term does not by itself connote a maximum number of elements having a certain name that can be present in a claimed device or method. Any suitable number of additional elements may be used unless a claim requires otherwise. Ordinal terms are used in the claims merely as labels to distinguish one element having a certain name from another element having a same name. The use of terms such as "at least one" or "at least a first" in the claims to modify a claim element does not by itself connote that any other claim element lacking a similar modifier is limited to the presence of only a single element. Any suitable number of additional elements may be used unless a claim requires otherwise. The use of "including," "comprising," or "having," "containing," "involving," and variations thereof herein, is meant to encompass the items listed thereafter and equivalents thereof as well as additional items.

What is claimed is:

1. A tracking oscillator circuit for recovering a clock frequency of a received data signal from a controller area network (CAN) bus, the received data signal operating based upon a plurality of state transitions, the tracking oscillator circuit comprising:
    an edge detector circuit configured to detect at least one state transition of the received data signal, the at least one state transition comprising one of a rising edge or a falling edge;
    an oscillator circuit configured to
        generate an internal oscillator signal of a first frequency, the received data signal being based upon a second frequency, and
        synchronize the first frequency with the second frequency of the received data signal; and
    a synchronization generator circuit coupled to said edge detector circuit and configured to generate at least one synchronization signal based upon the detected at least one state transition.

2. The tracking oscillator circuit of claim 1 wherein the oscillator circuit comprises:
    a first set of switches configured to be controlled by a first state of the at least one a synchronization signal; and
    a second set of switches configured to be controlled by a second state of the at least one synchronization signal, the oscillator circuit being reset during the first state, the oscillator being free running during the second state.

3. The tracking oscillator circuit of claim 1 further comprising a track and counter circuit configured to adjust the first frequency of the oscillator circuit.

4. The tracking oscillator circuit of claim 1 further comprising a sampling circuit configured to sample the received data signal at a programmable sampling point.

5. A controller area network (CAN) bus system comprising:
    a CAN bus; and
    a tracking oscillator circuit for recovering a clock frequency of a received data signal from said CAN bus, the received data signal operating based upon a plurality of state transitions, the tracking oscillator circuit comprising
        an edge detector circuit configured to detect at least one state transition of the received data signal, the at least one state transition comprising one of a rising edge or a falling edge,
        an oscillator circuit configured to
            generate an internal oscillator signal of a first frequency, the received data signal being based upon a second frequency, and
            synchronize the first frequency with the second frequency of the received data signal, and
        a synchronization generator circuit coupled to said edge detector circuit and configured to generate at least one synchronization signal based upon the detected at least one state transition.

6. The CAN bus system of claim 5 wherein the oscillator circuit comprises:
    a first set of switches configured to be controlled by a first state of the at least one synchronization signal; and
    a second set of switches configured to be controlled by a second state of the at least one synchronization signal, the oscillator circuit being reset during the first state, the oscillator being free running during the second state.

7. The CAN bus system of claim 5 further comprising a track and counter circuit configured to adjust the first frequency of the oscillator circuit.

8. The CAN bus system of claim 5 further comprising a sampling circuit configured to sample the received data signal at a programmable sampling point.

9. The CAN bus system of claim 5 wherein the first frequency is equal to the second frequency.

10. The CAN bus system of claim 5 wherein the oscillator circuit comprises a capacitive element; and further comprising a compensation circuit configured to charge and discharge said capacitive element.

11. The CAN bus system of claim 10 wherein the capacitive element has a value of 2 pF.

12. A method for recovering a clock frequency of a received data signal from a controller area network (CAN) bus, the received data signal operating based upon a plurality of state transitions, the method comprising:
    detecting at least one state transition of the received data signal, the at least one state transition comprising one of a rising edge or a falling edge;
    operating an oscillator circuit to generate an internal oscillator signal of a first frequency, the received data signal being based upon a second frequency;
    operating the oscillator circuit to synchronize the first frequency with the second frequency of the received data signal; and
    generating at least one synchronization signal based upon the detected at least one state transition.

13. The method of claim 12 further comprising:
    controlling a first set of switches in the oscillator circuit by a first state of the at least one synchronization signal; and
    controlling a second set of switches in the oscillator circuit by a second state of the at least one synchronization signal, the oscillator circuit being reset during the first state, the oscillator being free running during the second state.

14. The method of claim 12 further comprising operating a track and counter circuit to adjust the first frequency of the oscillator circuit.

15. The method of claim 12 further comprising operating a sampling circuit to sample the received data signal at a programmable sampling point.

16. The method of claim 12 further comprising computing a restart time for resetting the oscillator circuit, and generating the at least one synchronization signal based on the computed restart time; and wherein the at least one synchronization signal is configured to restart the oscillator circuit when the at least one state transition is detected.

17. The method of claim 12 further comprising computing a compensation time for charging and discharging a capacitive element of the oscillator circuit such that an operational frequency of the oscillator circuit is maintained.

* * * * *

UNITED STATES PATENT AND TRADEMARK OFFICE
CERTIFICATE OF CORRECTION

| | | |
|---|---|---|
| PATENT NO. | : 9,032,239 B2 | Page 1 of 1 |
| APPLICATION NO. | : 13/716029 | |
| DATED | : May 12, 2015 | |
| INVENTOR(S) | : Cai et al. | |

It is certified that error appears in the above-identified patent and that said Letters Patent is hereby corrected as shown below:

In the Claims,

Column 8, Line 24    Delete: "one a synchronization"
                     Insert: --one synchronization--

Signed and Sealed this
Twenty-ninth Day of September, 2015

Michelle K. Lee
*Director of the United States Patent and Trademark Office*